(12) United States Patent
Park

(10) Patent No.: US 12,444,082 B2
(45) Date of Patent: Oct. 14, 2025

(54) DEVICE AND METHOD FOR CALIBRATING A CAMERA OF A VEHICLE

(71) Applicants: HYUNDAI MOTOR COMPANY, Seoul (KR); KIA CORPORATION, Seoul (KR)

(72) Inventor: Jong Min Park, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 123 days.

(21) Appl. No.: 18/084,056

(22) Filed: Dec. 19, 2022

(65) Prior Publication Data

US 2024/0046518 A1 Feb. 8, 2024

(30) Foreign Application Priority Data

Aug. 8, 2022 (KR) .................. 10-2022-0098725

(51) Int. Cl.
*G06T 7/80* (2017.01)
*G06T 3/18* (2024.01)
*G06V 10/25* (2022.01)
*G06V 10/75* (2022.01)
*G06V 20/56* (2022.01)

(52) U.S. Cl.
CPC ................ *G06T 7/80* (2017.01); *G06T 3/18* (2024.01); *G06V 10/25* (2022.01); *G06V 10/751* (2022.01); *G06V 20/588* (2022.01); *G06T 2207/30256* (2013.01)

(58) Field of Classification Search
CPC ... G06T 7/80; G06T 3/18; G06T 2207/30256; G06T 7/85; G06T 7/11; G06T 7/73; G06T 2207/30252; G06V 10/25; G06V 10/751; G06V 20/588
USPC ......................................... 348/187
See application file for complete search history.

(56) References Cited

U.S. PATENT DOCUMENTS

| | | | |
|---|---|---|---|
| 10,298,910 B1* | 5/2019 | Kroeger | G06T 7/85 |
| 2016/0104047 A1* | 4/2016 | Sibiryakov | G06V 20/58 |
| | | | 382/103 |
| 2016/0125612 A1* | 5/2016 | Seki | G06V 20/20 |
| | | | 382/106 |
| 2020/0005489 A1* | 1/2020 | Kroeger | G06T 7/85 |
| 2021/0224562 A1* | 7/2021 | Zhan | G06V 20/58 |

(Continued)

FOREIGN PATENT DOCUMENTS

| | | |
|---|---|---|
| CN | 112001968 A | 11/2020 |
| JP | 2022518324 A | 3/2022 |

(Continued)

*Primary Examiner* — Michael E Teitelbaum
(74) *Attorney, Agent, or Firm* — Lempia Summerfield Katz LLC

(57) ABSTRACT

A device for calibrating a camera of a vehicle includes: a first camera for acquiring a first image, a second camera for acquiring a second image, and a processor that extracts a first class of interest from the first image, and extracts a second class of interest from the second image. The processor projects pixel coordinates of the first class of interest onto the second image to convert the pixel coordinates, and corrects parameters of the second camera such that a difference between the converted pixel coordinates of the first class of interest and pixel coordinates of the second class of interest is minimized.

14 Claims, 9 Drawing Sheets

(56) References Cited

U.S. PATENT DOCUMENTS

2022/0101548 A1* 3/2022 Li .......................... G06V 20/56
2023/0188696 A1* 6/2023 Newman .............. H04N 13/246
　　　　　　　　　　　　　　　　　　　　　348/48
2024/0013437 A1* 1/2024 Simon ....................... G06T 7/68

FOREIGN PATENT DOCUMENTS

KR　　　101880185　B1　　7/2018
KR　　　102006291　B1　　8/2019

* cited by examiner

DEVICE AND METHOD FOR CALIBRATING A CAMERA OF A VEHICLE

CROSS-REFERENCE TO RELATED APPLICATION

This application claims the benefit of and priority to Korean Patent Application No. 10-2022-0098725, filed in the Korean Intellectual Property Office on Aug. 8, 2022, the entire contents of which are incorporated herein by reference.

FIELD

The present disclosure relates to a device and a method for calibrating a camera of a vehicle.

BACKGROUND

The statements in this section merely provide background information related to the present disclosure and may not constitute prior art.

An autonomous vehicle uses an image acquired via a camera disposed on the vehicle during travel control fused with a result of recognition by deep learning. For this purpose, images acquired by a plurality of cameras disposed on the vehicle must be calibrated to be converted into the same real-world coordinates.

However, the cameras are located in a front portion and left and right portions of the vehicle, so that the images acquired during travel are different from each other and various obstacles exist in the acquired images. Thus, it is hard to find points desired to estimate a relationship between the plurality of cameras. Therefore, a technology development is desired to provide information necessary for the vehicle travel by correcting the plurality of images acquired by the plurality of cameras on the autonomous vehicle to be converted into the same real word coordinates.

SUMMARY

The present disclosure has been made to solve the above-mentioned problems occurring in the prior art while advantages achieved by the prior art are maintained intact.

An aspect of the present disclosure provides a device and a method for calibrating a camera that correct a plurality of images acquired by a plurality of cameras to be converted into the same real-world coordinates.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, a device for calibrating a camera of a vehicle includes: a first camera for acquiring a first image, a second camera for acquiring a second image, and a processor that extracts a first class of interest from the first image, and extracts a second class of interest from the second image. In particular, the processor projects pixel coordinates of the first class of interest onto the second image to convert the pixel coordinates, and corrects parameters of the second camera such that a difference between the converted pixel coordinates of the first class of interest and pixel coordinates of the second class of interest is minimized.

In one implementation, the processor may set a region including an object having a height of zero "0" in a predetermined region of the first image as a region of interest, and extract pixels of the region of interest as the first class of interest.

In one implementation, the processor may set a region including an object having a height of zero "0" in a predetermined region of the second image as a region of interest, and extract pixels of the region of interest as the second class of interest.

In one implementation, the processor may extract a line or a pattern painted on a road surface as the first class of interest.

In one implementation, the processor may extract a line or a pattern painted on a road surface as the second class of interest.

In one implementation, the processor may convert the pixel coordinates of the first class of interest by projecting the pixel coordinates onto the second image using a warping function.

In one implementation, the first camera and the second camera may be disposed at different positions.

According to another aspect of the present disclosure, a method for calibrating a camera of a vehicle includes: acquiring a first image from a first camera; acquiring a second image from a second camera; extracting a first class of interest from the first image; and extracting a second class of interest from the second image. The method further includes: projecting pixel coordinates of the first class of interest onto the second image to convert the pixel coordinates; and correcting parameters of the second camera such that a difference between the converted pixel coordinates of the first class of interest and pixel coordinates of the second class of interest is minimized.

In one implementation, the method may further include: setting a region including an object having a height of zero "0" in a predetermined region of the first image as a region of interest, and extracting pixels of the region of interest as the first class of interest.

In one implementation, the method may further include: setting a region including an object having a height of zero "0" in a predetermined region of the second image as a region of interest, and extracting pixels of the region of interest as the second class of interest.

In one implementation, the method may further include extracting a line or a pattern painted on a road surface as the first class of interest.

In one implementation, the method may further include extracting a line or a pattern painted on a road surface as the second class of interest.

In one implementation, the method may further include converting the pixel coordinates of the first class of interest by projecting the pixel coordinates onto the second image using a warping function.

In one implementation, the first camera and the second camera may be disposed at different positions.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Figure 1:
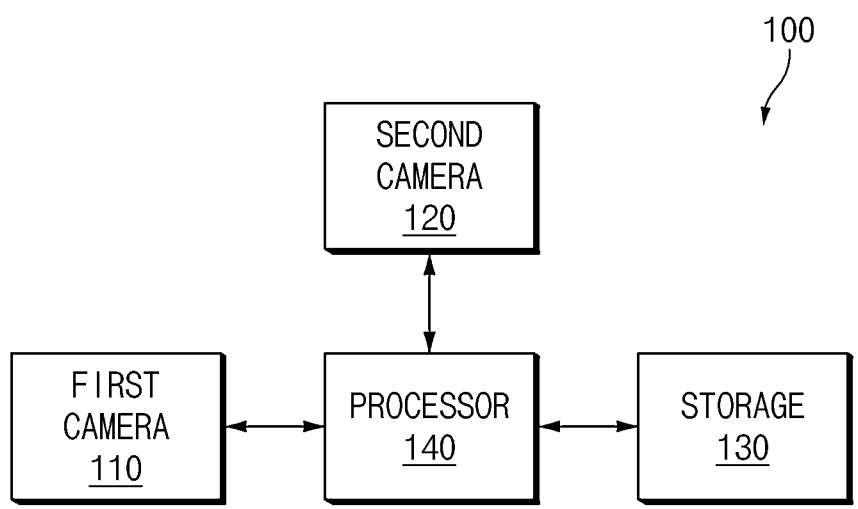
FIG. 1 is a view showing a configuration of a camera calibration device of a vehicle according to an embodiment of the present disclosure.

Hereinafter, some embodiments of the present disclosure are described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function has been omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It should be further understood that terms, such as those defined in commonly used dictionaries, should be interpreted as having a meaning that is consistent with their meaning in the context of the relevant art and should not be interpreted in an idealized or overly formal sense unless expressly so defined herein.

When a component, device, element, or the like of the present disclosure is described as having a purpose or performing an operation, function, or the like, the component, device, or element should be considered herein as being "configured to" meet that purpose or to perform that operation or function.

FIG. 1 is a view showing a configuration of a camera calibration device of a vehicle according to an embodiment of the present disclosure.

As shown in FIG. 1, a camera calibration device 100 of a vehicle may include: a first camera 110, a second camera 120, a storage 130, and a processor 140.

According to an embodiment, the first camera 110 may be disposed in a front portion of the vehicle to acquire a first image including a front image of the vehicle. However, the present disclosure may not be limited thereto. The first camera 110 may be disposed in a rear portion of the vehicle to acquire the first image including a rear image of the vehicle.

The second camera 120 may be disposed at a position different from that of the first camera 110. According to an embodiment of the present disclosure, the second camera 120 may be disposed in a side portion of the vehicle to acquire a second image including a side image of the vehicle.

The storage 130 may store at least one algorithm for performing calculation or execution of various commands for an operation of the camera calibration device of the vehicle according to an embodiment of the present disclosure. The storage 130 may include at least one storage medium among a flash memory, a hard disc, a memory card, a read-only memory (ROM), a random access memory (RAM), an electrically erasable programmable read-only memory (EEPROM), a programmable read-only memory (PROM), a magnetic memory, a magnetic disk, and an optical disk.

The processor 140 may extract a class of interest from the images acquired from the first camera 110 and the second camera 120. A more detailed description is made with reference to FIGS. 2 to 5.

FIGS. 2 to 5 are views showing a class of interest extracted according to an embodiment of the present disclosure.

Figure 2:
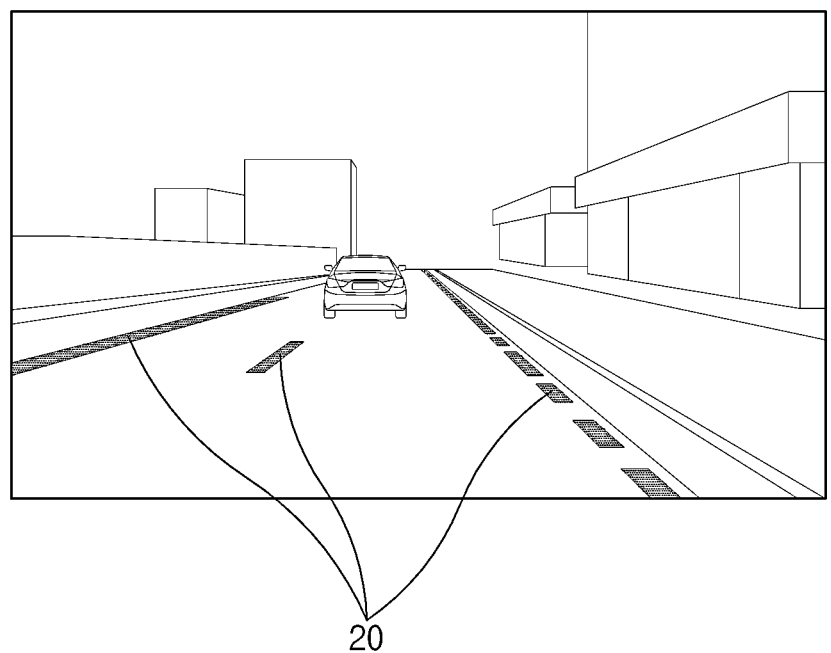
FIGS. 2 to 5 are views showing a class of interest extracted according to an embodiment of the present disclosure.

As shown in FIG. 2, the processor 140 may extract a first class of interest 20 from the first image acquired from the first camera 110. According to an embodiment, the processor 140 may set a region including an object having a height of zero "0" in a predetermined region of the first image as a region of interest, and extract pixels of the region of interest as the first class of interest. As an example, the processor 140 may extract a line or a pattern painted on a road surface as the first class of interest. The processor 140 may obtain pixel coordinates of the first class of interest.

Figure 3:
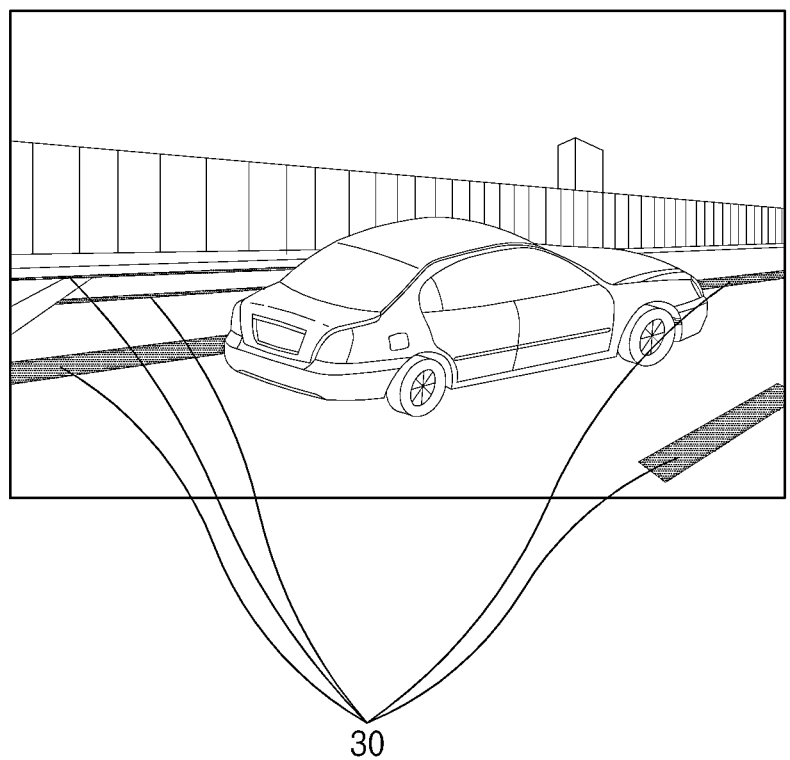

In addition, as shown in FIG. 3, the processor 140 may extract a second class of interest 30 from the second image acquired from the second camera 120. According to an embodiment, the processor 140 may set a region including an object having a height of zero "0" in a predetermined region of the second image as the region of interest, and extract pixels of the region of interest as the second class of interest. As an example, the processor 140 may extract the line or the pattern painted on the road surface as the second class of interest. The processor 140 may obtain pixel coordinates of the second class of interest.

Figure 4:
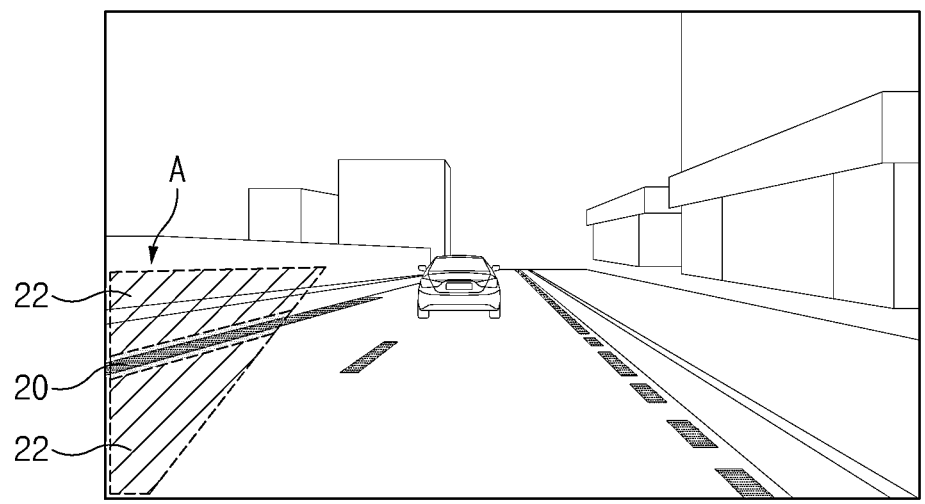

As shown in FIG. 4, the processor 140 may assign a background class 22 to pixels of a region excluding pixels of a region of interest in a predetermined region "A" of the first image acquired from the first camera 110.

Figure 5:
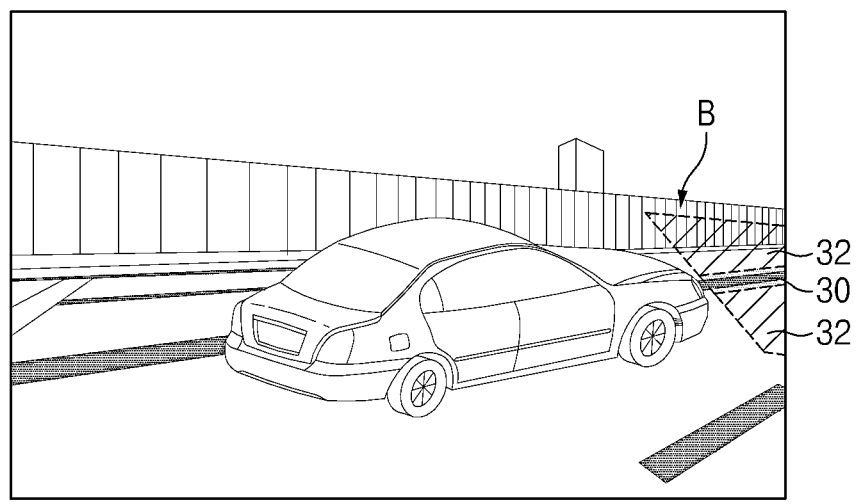

In addition, as shown in FIG. 5, the processor 140 may assign a background class 32 to pixels of a region excluding pixels of a region of interest in a predetermined region "B" of the second image acquired from the second camera 120.

The processor 140 may convert the pixel coordinates of the first class of interest extracted from the first image by projecting the pixel coordinates onto the second image. According to an embodiment, the processor 140 may convert the pixel coordinates of the first class of interest by projecting the pixel coordinates onto the second image using a warping function "W".

$$W(u_{front}, v_{front}, p) = h_{side}(h^{-1}_{front}(u_{front}, v_{front})) \quad \text{<Calculation Formula 1>}$$

where, $(u_{front}, v_{front})$ is the pixel coordinates of the first class of interest).

p (a second camera parameter) of Calculation Formula 1 may be represented with Calculation Formula 2. In addition, $h_{side}(x,y)$ and $h_{front}(x,y)$ may be represented with Calculation Formula 3 and Calculation Formula 4, respectively.

$$p = [\Phi, \theta, \psi, t_x, t_y, t_z]^T \quad \text{<Calculation Formula 2>}$$

where, φ is a first parameter of the second camera, Φ is a second parameter of the second camera, ψ is a third parameter of the second camera, $t_x$ is a fourth parameter of the second camera, $t_y$ is a fifth parameter of the second camera, $t_z$ is a sixth parameter of the second camera, and T is a transpose.

$$h_{side}(x, y) = \begin{bmatrix} \frac{h_{00x} + h_{01y} + h_{02}}{h_{20x} + h_{21y} + h_{22}} \\ \frac{h_{10x} + h_{11y} + h_{12}}{h_{20x} + h_{21y} + h_{22}} \end{bmatrix} = \begin{bmatrix} u_{side} \\ v_{side} \end{bmatrix} \quad <\text{Calculation Formula 3}>$$

where, $h_{00}$ to $h_{22}$ are calculated using a 3*3 homography matrix calculated with the parameters of the second camera.

$$h_{front}(x, y) = \begin{bmatrix} \frac{h_{00x} + h_{01y} + h_{02}}{h_{20x} + h_{21y} + h_{22}} \\ \frac{h_{10x} + h_{11y} + h_{12}}{h_{20x} + h_{21y} + h_{22}} \end{bmatrix} = \begin{bmatrix} u_{front} \\ v_{front} \end{bmatrix} \quad <\text{Calculation Formula 4}>$$

where, $h_{00}$ to $h_{22}$ are calculated using a 3*3 homography matrix calculated with parameters of the first camera.

The processor 140 may project the pixel coordinates of the first class of interest onto the second image and convert the pixel coordinates using Calculation Formula 1 to calculate the converted pixel coordinates of the first class of interest.

The processor 140 may correct the parameters of the second camera such that a difference between the converted pixel coordinates of the first class of interest and the pixel coordinates of the second class of interest is minimized. According to an embodiment, the processor 140 may iterate the calculation process in Calculation Formula 5 such that a difference "E" between the pixel coordinates of the first class of interest and the pixel coordinates of the second class of interest is minimized.

$$E = \sum_{u_{front}, v_{front} \in ROI} [C_{front}(u_{front}, v_{front}) - C_{side}(W(u_{front}, v_{front}, p))]^2 \quad <\text{Calculation Formula 5}>$$

where, $C_{front}$ is the first image, $C_{side}$ is the second image, $(u_{front}, v_{front})$ is the pixel coordinates of the first class of interest, and W is the warping function.

Figure 6:
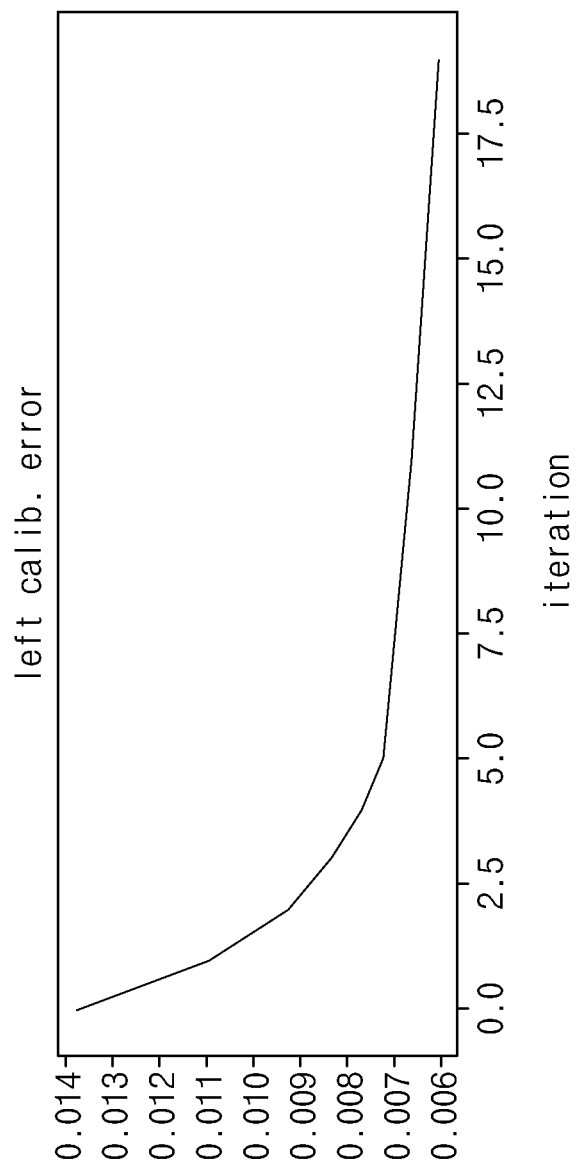
FIG. 6 is a calibration graph of a second camera according to an embodiment of the present disclosure.
Figure 7:
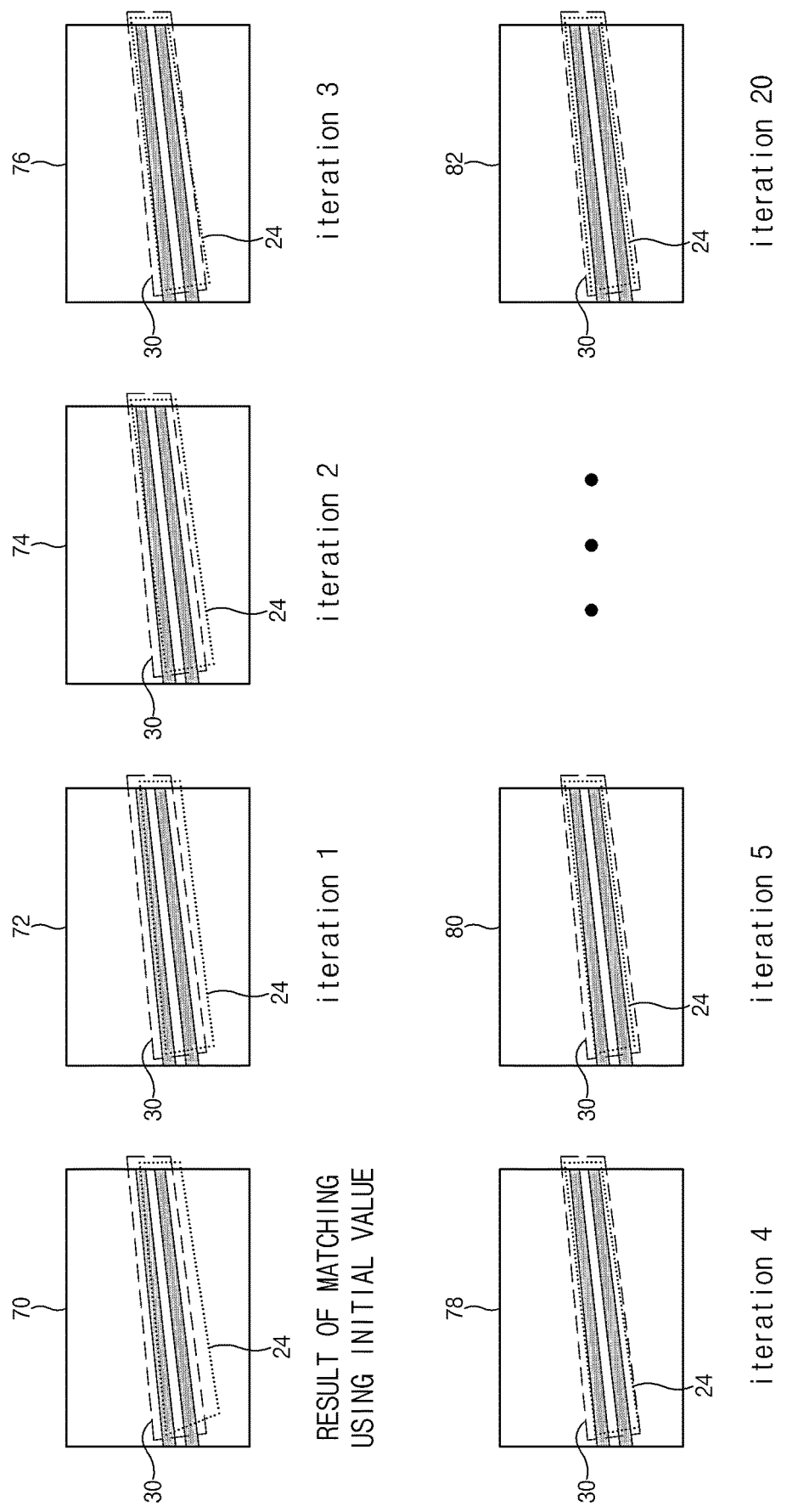
FIG. 7 is a view showing a change in matching of a first image and a second image according to an embodiment of the present disclosure.

A more detailed description is made with reference to FIGS. 6 and 7.

FIG. 6 is a calibration graph of a second camera according to an embodiment of the present disclosure, and FIG. 7 is a view showing a change in matching of a first image and a second image based on an increase in the number of iterations according to an embodiment of the present disclosure.

As shown in FIG. 6, the processor 140 may correct the parameters of the second camera by increasing the number of iterations of the calculation process in Calculation Formula 5 to minimize the difference (an error) between the pixel coordinates of the first class of interest and the pixel coordinates of the second class of interest.

FIG. 7 includes a first image 70 to a seventh image 82 showing the change in the matching of the first image and the second image based on the increase in the number of iterations according to an embodiment of the present disclosure. In an embodiment of the present disclosure, when an initial value of the pixel coordinates of the first class of interest converted using the warping function is projected onto the second image, as in the first image 70, a difference occurs between the second class of interest 30 of the second image and a converted first class of interest 24.

The processor 140 may iterate the calculation in Calculation Formula 5 20 times and continuously correct the parameters of the second camera, thereby minimizing the difference between the first class of interest 24 converted as in the second image 72 to the seventh image 82 and the second class of interest 30 of the second image.

Figure 8:
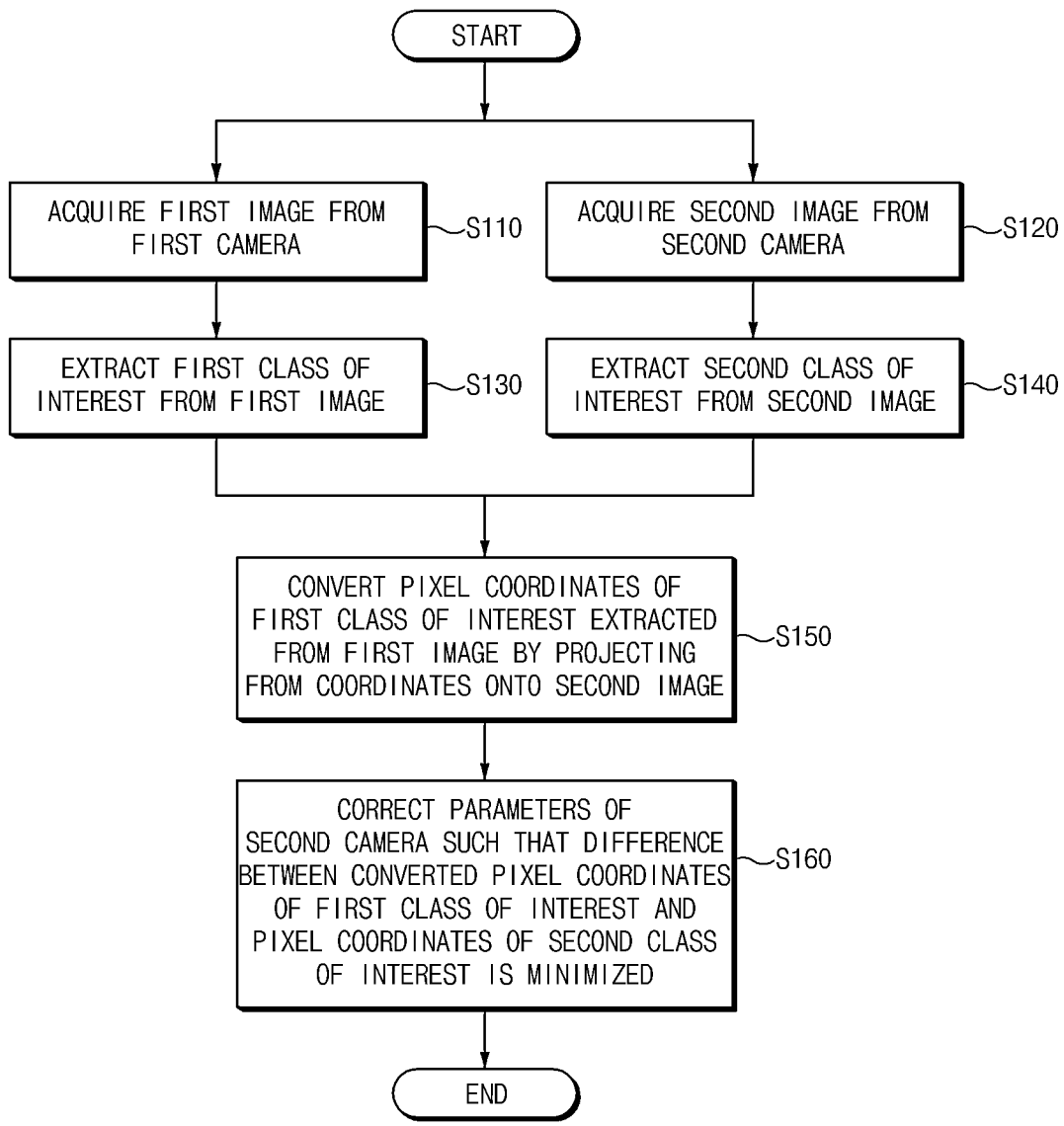
FIG. 8 is a flowchart illustrating a camera calibration method of a vehicle according to an embodiment of the present disclosure.

FIG. 8 is a view showing a camera calibration method of a vehicle according to an embodiment of the present disclosure.

As shown in FIG. 8, the processor 140 may acquire the first image from the first camera 110 (S110). In addition, the processor 140 may acquire the second image from the second camera 120 (S120).

The processor 140 may extract the first class of interest 20 from the first image acquired from the first camera 110 (S130). According to an embodiment, in S130, the processor 140 may set the region including the object having the height of zero "0" in the predetermined region of the first image as the region of interest, and the processor 140 may extract the pixels of the region of interest as the first class of interest. For example, the processor 140 may extract the line or the pattern painted on the road surface as the first class of interest. The processor 140 may obtain the pixel coordinates of the first class of interest.

In addition, the processor 140 may extract the second class of interest 30 from the second image acquired from the second camera 120 (S140). According to an embodiment, in S140, the processor 140 may set the region including the object having the height of zero "0" in the predetermined region of the second image as the region of interest, and the processor 140 may extract the pixels in the region of interest as the second class of interest. For example, the processor 140 may extract the line or the pattern painted on the road surface as the second class of interest. The processor 140 may obtain the pixel coordinates of the second class of interest.

The processor 140 may convert the pixel coordinates of the first class of interest extracted from the first image by projecting the pixel coordinates onto the second image (S150). According to an embodiment, in S150, the processor 140 may convert the pixel coordinates of the first class of interest by projecting the pixel coordinates onto the second image using the warping function "W" (see, Calculation Formula 1), and calculate the converted pixel coordinates of the first class of interest.

The processor 140 may correct the parameters of the second camera such that the difference between the converted pixel coordinates of the first class of interest and the pixel coordinates of the second class of interest is minimized (S160). According to an embodiment, the processor 140 may iterate the calculation process in Calculation Formula 5 such that the difference between the pixel coordinates of the first class of interest and the pixel coordinates of the second class of interest is minimized.

Figure 9:
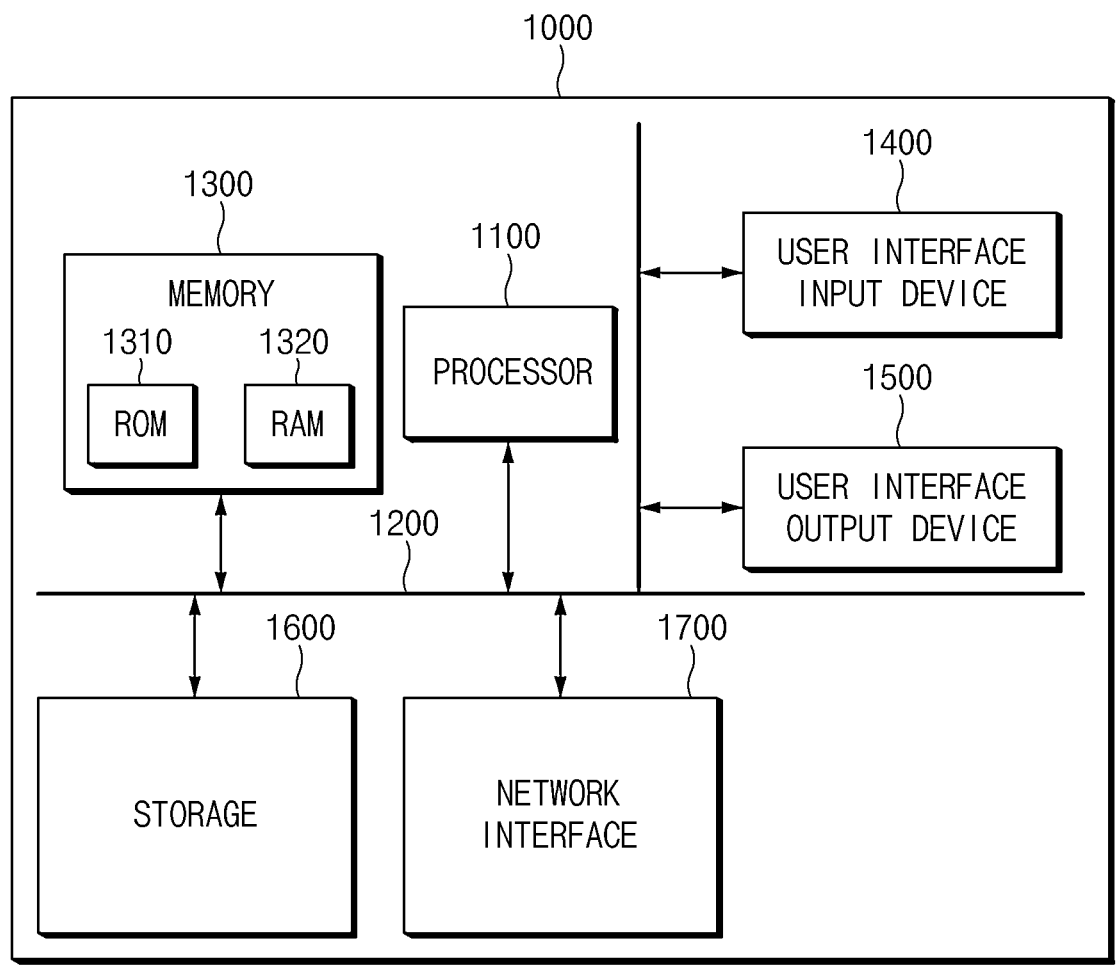
FIG. 9 is a view showing a configuration of a computing system executing a method according to an embodiment of the present disclosure.

FIG. 9 is a view showing a configuration of a computing system executing a method according to an embodiment of the present disclosure.

With reference to FIG. 9, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those having ordinary skill in the art without departing from the essential characteristics of the present disclosure.

Therefore, the embodiments disclosed in the present disclosure are not intended to limit the technical idea of the present disclosure but to illustrate the present disclosure. The scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The device and the method for calibrating the camera of the vehicle according to an embodiment of the present disclosure may correct the plurality of images acquired by the plurality of cameras to be converted into the same real-world coordinates, and provide the information necessary for the travel of the autonomous vehicle, thereby improving travel safety.

Hereinabove, although the present disclosure has been described with reference to exemplary embodiments and the accompanying drawings, the present disclosure is not limited thereto, but may be variously modified and altered by those having ordinary skill in the art to which the present disclosure pertains without departing from the spirit and scope of the present disclosure.

What is claimed is:

1. A device for calibrating a camera of a vehicle, the device comprising:
a first camera configured to acquire a first image;
a second camera configured to acquire a second image; and
a processor configured to:
extract a first class of interest from the first image;
extract a second class of interest from the second image;
project pixel coordinates of the first class of interest onto the second image to convert the pixel coordinates; and
correct parameters of the second camera such that a difference between the converted pixel coordinates of the first class of interest and pixel coordinates of the second class of interest is minimized,
wherein the converted pixel coordinates of the first class of interest are generated by inputting the pixel coordinates of the first class of interest and the parameters of the second camera to a warping function, and
wherein the first class of interest and the second class of interest include an object having a height of zero "0".

2. The device of claim 1, wherein the processor is configured to:
set a region including the object having the height of zero "0" in a predetermined region of the first image as a region of interest; and
extract pixels of the region of interest as the first class of interest.

3. The device of claim 1, wherein the processor is configured to:
set a region including the object having the height of zero "0" in a predetermined region of the second image as a region of interest; and
extract pixels of the region of interest as the second class of interest.

4. The device of claim 1, wherein the processor is configured to extract a line or a pattern painted on a road surface as the first class of interest.

5. The device of claim 1, wherein the processor is configured to extract a line or a pattern painted on a road surface as the second class of interest.

6. The device of claim 1, wherein the processor is configured to convert the pixel coordinates of the first class of interest by projecting the pixel coordinates onto the second image using the warping function.

7. The device of claim 1, wherein the first camera and the second camera are disposed at different positions.

8. A method for calibrating a camera of a vehicle, the method comprising:
acquiring a first image from a first camera and acquiring a second image from a second camera;
extracting a first class of interest from the first image and extracting a second class of interest from the second image;
projecting pixel coordinates of the first class of interest onto the second image to convert the pixel coordinates; and
correcting parameters of the second camera such that a difference between the converted pixel coordinates of the first class of interest and pixel coordinates of the second class of interest is minimized,
wherein the converted pixel coordinates of the first class of interest are generated by inputting the pixel coordinates of the first class of interest and the parameters of the second camera to a warping function, and
wherein the first class of interest and the second class of interest include an object having a height of zero "0".

9. The method of claim 8, further comprising:
setting a region including the object having the height of zero "0" in a predetermined region of the first image as a region of interest; and extracting pixels of the region of interest as the first class of interest.

10. The method of claim 8, further comprising:
setting a region including the object having the height of zero "0" in a predetermined region of the second image as a region of interest; and
extracting pixels of the region of interest as the second class of interest.

11. The method of claim 8, further comprising:
extracting a line or a pattern painted on a road surface as the first class of interest.

12. The method of claim 8, further comprising:
extracting a line or a pattern painted on a road surface as the second class of interest.

13. The method of claim 8, further comprising:
converting the pixel coordinates of the first class of interest by projecting the pixel coordinates onto the second image using the warping function.

14. The method of claim 8, wherein the first camera and the second camera are disposed at different positions.

* * * * *